United States Patent [19]
Challapali et al.

[11] Patent Number: 6,084,982
[45] Date of Patent: Jul. 4, 2000

[54] METHOD OF CHROMA-KEYING FOR A DIGITAL VIDEO COMPRESSION SYSTEM

[75] Inventors: Kiran Challapali, Stamford, Conn.; Yingwei Chen, Ossining, N.Y.

[73] Assignee: Philips Electronics North America Corp., New York, N.Y.

[21] Appl. No.: 08/992,291

[22] Filed: Dec. 17, 1997

[51] Int. Cl.[7] ................................................... H04N 9/75
[52] U.S. Cl. ........................... 382/166; 348/587; 348/592
[58] Field of Search ................................... 382/166, 165, 382/239, 164; 348/239, 578, 584–587, 590–592, 598, 599

[56] References Cited

U.S. PATENT DOCUMENTS

| | | | |
|---|---|---|---|
| 5,621,466 | 4/1997 | Miyane et al. | 348/405 |
| 5,835,158 | 11/1998 | Lowe | 348/574 |

OTHER PUBLICATIONS

Horne et al., "Study of the Characteristics of the MPEG2 4:2:2 Profile—Application of MPEG2 in Studio Environment", IEEE Transactions on Circuits and Systems for Video Technology, vol. 6, No. 3, pp. 251–272, Jun. 1996.

"Televison Animation Store: Digital Chroma–Key and Mixer Units" by V.G. Devereux; BBC Research and Development Report, published 1984.

"A proposed Computer–Controlled Digital HDTV Chroma–Key System", by Z. Misawa et al, S.M.P.T.E. Journal, Mar. 1995.

*Primary Examiner*—Amelia Au
*Assistant Examiner*—Larry Prikockis
*Attorney, Agent, or Firm*—Gregory L. Thorne

[57] ABSTRACT

A method of performing chroma-key coding including the steps of defining color regions and quantifying the number of pixels in the regions, classifying macroblocks in accordance with the number of pixels thus quantified, assigning chroma complexity weights for use in the computation of quantization step-size based on the classification of the macroblocks, computing the quantization step-size, performing quantization and performing variable length coding.

15 Claims, 3 Drawing Sheets

METHOD OF CHROMA-KEYING FOR A DIGITAL VIDEO COMPRESSION SYSTEM

This invention was made with United States Government support under Cooperative Agreement No. 70NANB5H1174 awarded by the National Insititute For Standards and Technology (NIST). The United States Government has certain rights in the invention.

FIELD OF THE INVENTION

The present invention relates to chroma-key coding in general, and in particular, to a method of coding video such that the effect of compression on the video composited using chroma-key coding is minimized.

DESCRIPTION OF THE RELATED ART

It is well known that picture quality utilizing chroma-keying will depend on the degradation at the edge areas between a foreground image and a background image.

As television studios are moving towards the transmission of digital video, it is only logical to develop technology that permits for chroma-keying in the digital domain. One early work on digital chroma-keying is described in a paper entitled "Television Animation Store: Digital Chroma-Key And Mixer Units" by V. G. Devereux (BBC Research and Development Report, published 1984). This aforementioned work, primarily developed for animated picture sequences, introduces circuitry that operates on digital YUV video signals and can generate key signals from any selected color in the foreground picture. The key signals are then used to replace the areas of the chosen color in the foreground picture by a background picture using linear, additive key techniques.

In a more recent paper, published in the March, 1995 issue of the S.M.P.T.E. Journal and entitled "A Proposed Computer-Controlled Digital HDTV Chroma-Key System", by Z. Misawa et al., a soft chroma-key method is utilized to subtract the chroma-key color while considering the distribution of chrominance on the edge area.

Although the systems proposed in the aforementioned papers may overcome shortcomings in the prior art, they still fall short in view of the ever advancing aspects and difficulties associated with compressed digital video.

Moreover, as studios move towards embracing the production and distribution of HDTV programming, it is inevitable that digital video compression will be used because the uncompressed bandwidth of an HDTV signal is about 1200 Megabits per second and it is too cumbersome to route within the studio. That is, it is necessary to compress the HDTV signals for intra-studio transmission.

However, the compression of the video signal introduces artifacts into the video signal. Moreover, the quantitative amount of artifacts are a function of the operation being performed, such as for example, during chroma-keying, which introduces an undesirable number of artifacts into the video signal.

Inherently, chroma-keying is a complex process, requiring consideration of about twenty parameters for proper and accurate chroma-keying, although the parameters are set by those skilled in the chroma-keying art, thereby making the chroma-keying operation somewhat of an art form. As would be appreciated by one skilled in the art, uneven lighting, shadows on the colored (blue) screen, the fidelity of the chrominance signals, and unwanted (blue) light typically "spilling" onto the foreground, all add to the difficulty of achieving accurate chroma-keying and high picture quality. It is therefore necessary to develop a method of chroma-keying that introduces as few chroma-key related artifacts as possible.

Further, experimentation has demonstrated that a video encoder that is not particularly optimized for chroma-key video coding performs unsatisfactorily at the boundaries of the blue screen and the foreground object. However, the blue at these very boundary pixels contain composition information and therefore, the chroma-keying operation at such boundary pixels must be accurately controlled. Hence, optimizing an encoder in such a manner that these boundary pixels are quantized lightly (low quantization step-size) is advantageous. It is also advantageous that those pixels within the foreground object that carry transparency information be quantized lightly, as quantization has particularly adverse effects on chroma-key operations since the dynamic range of color-difference signals tends to be low.

Therefore, a method for coding video such that the effect of compression on the video composite using chroma-keying is minimal, is desired.

Additionally, it is desirous of providing a method for coding video that is applicable with both multiplicative chroma-keyers, where pixel in the composite video is taken from either of the two input video sources, as well as with additive chroma-keyers, where each pixel in the composite video is a weighted sum of corresponding (co-located) pixels in two input video sources and the weighting depends upon the composition information extracted from the blue screen video (the composition information is akin to α-channel as used in computer graphics terminology). Moreover, it should be appreciated that an additive keyer permits the keying of complex scenes such as reflections in transparent objects, shadows, veils, smoke, water, hair and other semitransparent objects with no visible aliasing in the composite scene.

SUMMARY OF THE INVENTION

Generally speaking, a method of performing chroma-key coding is provided. The method preferably includes the steps of defining a key color region around a key color line and denoting the pixels lying within the key color region as a key color and quantifying the number of the pixels as $N_k$, defining a background region around the key color line and denoting the pixels lying outside the background region as foreground colors and quantifying the number of the pixels as $N_f$, and defining all other colors that are neither the key color or the foreground colors as mixed colors and quantifying the number of the pixels representing the mixed colors as $N_m$, and performing the further steps of macroblock classification and quantization step-size assignment. In the preferred embodiment, the macroblock classification step includes the substeps of classifying a macroblock as a chroma-key color macroblock when $(N_T-N_k) \div N_T <$ a predefined constant, classifying a macroblock as a foreground macroblock when $(N_T-N_f) \div N_T <$ the predefined constant, classifying a macroblock as a transparency information macroblock when $(N_T-N_m) \div N_T <$ the predefined constant, and classifying a macroblock as a boundary macroblock when the macroblock is not a chroma-key color macroblock, a foreground object macroblock or a transparency macroblock. Thereafter, a chroma complexity weight for use in the computation of quantization step-size, based on the classification of the macroblocks, is assigned to the macroblocks. Lastly, quantization step-size assignment, quantization and variable length coding is performed.

In a preferred embodiment, this latter step may include the substeps of assigning a chroma complexity weight of about one (1) when the macroblock is either a key color macroblock or foreground macroblock, assigning the chroma complexity weight to about 75% of the predetermined chroma complexity weight when the macroblock is a transparency information macroblock and assigning the chroma complexity weight to about 50% of the predetermined chroma complexity weight when the macroblock is a boundary block.

Additionally, in accordance with the invention, a chroma-key coding apparatus which is capable of carrying out the above steps, is provided.

An object of the present invention to provide a method of chroma-key coding and coding video which minimizes the effect of compression on the video composite.

Still another object of the present invention to provide a method of chroma-key coding and coding video which minimizes the introduction of artifacts into the video signal.

Moreover, since chroma-key coding depends on the fidelity of the chrominance signals, it is an object of the present invention to provide a method of chroma-key coding that introduces as few chroma related coding artifacts as possible.

Another object of the present invention is to provide a method of chroma-key coding that is adapted for use in both an additive keyer and a multiplicative keyer.

Still other objects of the invention will in part be obvious and will in part be apparent from the specification.

The invention accordingly comprises the several steps and the relation of one or more of such steps with respect to each of the others, and the apparatus embodying features of construction, combination of elements, and arrangement of parts which are adapted to effect such steps, all as exemplified in the following detailed disclosure, and the scope of the invention will be indicated in the claims.

BRIEF DESCRIPTION OF THE DRAWING

For a fuller understanding of the invention, reference is made to the following description, taken in connection with the accompanying drawing, in which.

DETAILED DESCRIPTION OF THE PREFERRED EMBODIMENTS

Figure 1:
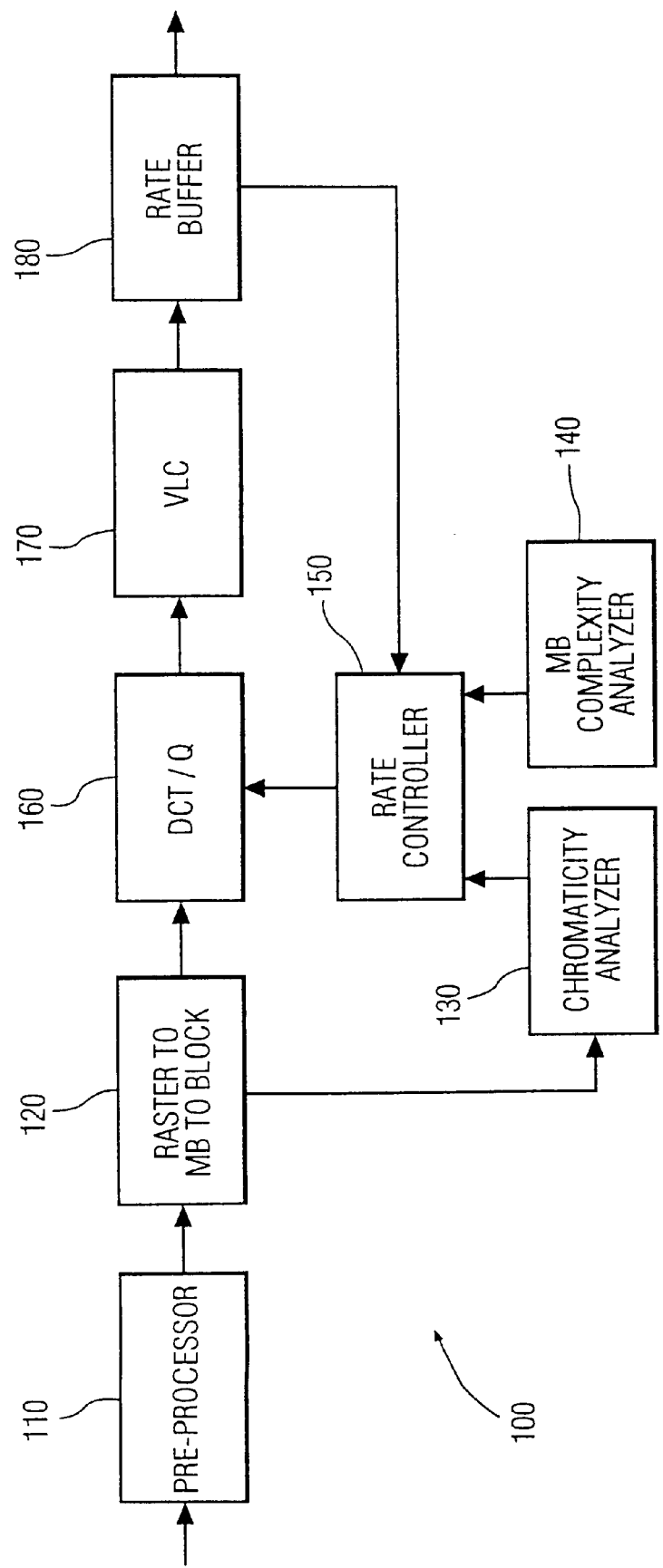
FIG. 1 is a block diagram of an MPEG-like I-frame encoder that may be used in the practice of the present invention, although it would be understood by one of ordinary skill that such an encoder could be utilized in an encoder that additionally includes P and B frames.

Reference is now made to FIG. 1, wherein an encoder, generally indicated at 100, constructed in accordance with the present invention, is depicted. Encoder 100 is particularly suited for performing the method of the present invention which includes the digitization, compression and combining, through chroma-key coding, of the two or more video images. For the embodiment depicted in FIG. 1, encoder 100 includes a preprocessor 110 for receiving as an input, digital video, and thereafter interlacing the video by taking two (2) fields and making a frame. A converter 120 is coupled to the output of preprocessor 120 for converting a frame to a macroblock. A chromaticity analyzer 130 is coupled to an output of converter 120 and analyses the chromaticity of the macroblock in accordance with the present invention. A macroblock complexity analyzer 140 is coupled to an output of chromaticity analyzer 130 and analyses the complexity of the macroblock. A rate controller 150 is coupled to the outputs of complexity analyzer 140 and chromaticity analyzer 130 and determines the quantization of the macroblock depending upon the (i) chromaticity of the macroblock, (ii) the complexity of the macroblock, and (iii) the fullness of the rate-buffer. A DCT transformer/Quantizer 160, coupled to outputs of converter 120 and rate controller 150, performs DCT for each block in the macroblock, followed by quantization according to the quantization step-size received by rate controller 150. A variable length coder 170 is coupled to the output of Transformer/Quantizer 160 and produces variable length codes. Lastly, a rate buffer 180, an input of which is coupled to the output of coder 170 and an output of which is coupled to rate controller 150, smooths out the instantaneous variation of the bit rate.

Generally speaking, a typical video sequence in a three-dimensional array of pixels can be denoted $I(x,y,t)$, where x and y are the spatial location of the pixel and t represents the temporal location of the pixel, i.e. the frame number. For purposes of the present invention and to facilitate an understanding thereof, the video consisting of the blue screen (the foreground video, will be represented by $F(x,y,t)$. The background video will be represented by $B(x,y,t)$ and the composite video will be represented by $O(x,y,t)$.

Moreover, $I(x,y,t)$ is represented in the YUV color space such that each pixel $I(x,y,t)$ has three components: the luminance component $I_Y(x,y,t)$ and the two respective color difference components $I_u(x,y,t)$ and $I_v(x,y,t)$. Furthermore, in the preferred embodiment, the color-difference signals are upsampled from their nominal 4:2:2 to 4:4:4 format and the blue color is represented by K, wherein nominally, $K_Y=128$, $K_U=180$ and $K I_V=128$.

Likewise, the key signal (which is also the composition information) is represented by $\Phi(x,y,t)$ and is a non-negative real-valued function, and, for the condition that $0 \leq \Phi(x,y,t) \leq \epsilon$ (where $\epsilon$ is a predefined constant determined heuristically. $O(x,y,t)$ is equal to $F(x,y,t)$ and in the preferred embodiment, $\epsilon \approx 0.05$, although other values could be used while remaining within the scope of the invention.

Lastly, it will be appreciated that the key signal is derived from $F_U(x,y,t)$ and $F_V(x,y,t)$ and differentiates between colors close to a chosen key color and the remaining colors in the foreground scene.

If $\mathfrak{R}$ a is a region in the foreground frame $F(x,y,t)$ encompassing all the pixels in the foreground object, that is, those pixels for which $\Phi(x,y,t) > \epsilon$, then $\overline{\mathfrak{R}}$ represents the blue area in the frame and $F(x,y,t) = \mathfrak{R} \cup \overline{\mathfrak{R}}$, and the background key signal, represented by $\Psi(x,y,t)$, is derived from the key signal $\Phi(x,y,t)$. $\Psi(x,y,t)$ is used for removing the region $\mathfrak{R}$ in $B(x,y,t)$ where the foreground image is to appear in the final chroma-keyed image.

The determination of $\Phi(x,y,t)$ is well-known in the art and will not be discussed in detail herein and therefore, it suffices to state that the derivation of $\Phi(x,y,t)$ is not a standardized calculation and that the present invention is not limited by and can be used in connection with any known method of obtaining $\Phi(x,y,t)$. Moreover, it should be understood that the determination of $\Phi(x,y,t)$ is specified in terms of parameters that can be tailored to specific chroma-key operations, as is presently done by those skilled in the art.

Figure 2:
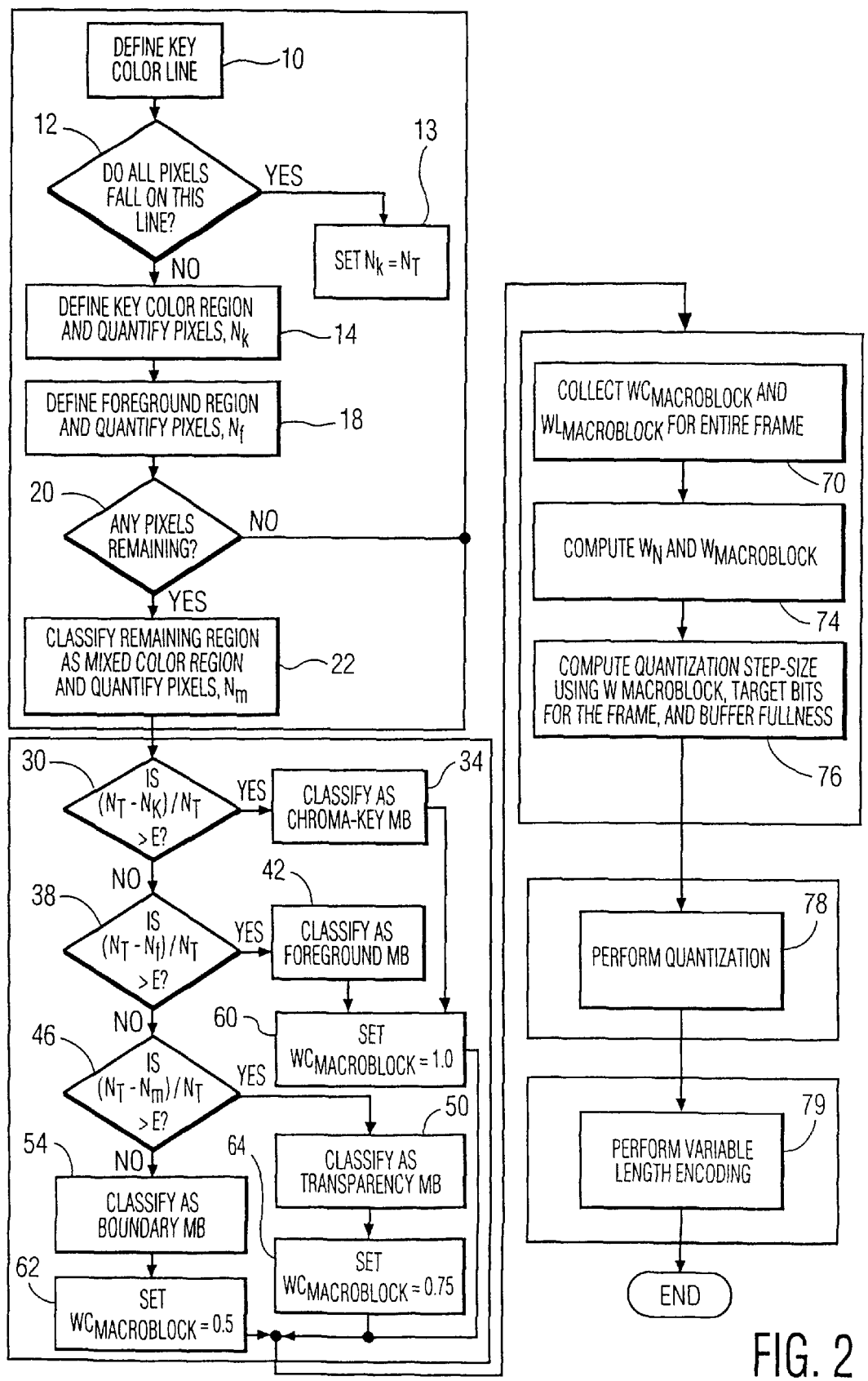
FIG. 2 illustrates the steps involved in carrying out the present invention.

Reference is now made generally to FIG. 2 which depicts a flowchart indicating the preferable chroma-key sensitive coding steps. Generally speaking, the preferred method first comprises the step of defining the regions about a key color line. Thereafter each macroblock is classified into one of four categories. The four categories are (1) chroma-key color area; (2) foreground object; (C) boundary block; and (4) blocks containing transparency information. The classification of macroblocks is preferably performed on a macroblock by macroblock basis and is based on the colors present in the macroblocks. In particular, the distribution of pixels in three color regions in the color space is determined, and the macroblocks are then classified. Thereafter, each macroblock is assigned a quantization step-size based on the classification of the macroblock. The particulars of each step will now be discussed in further detail, with reference also being made to FIG. 3.

Figure 3:
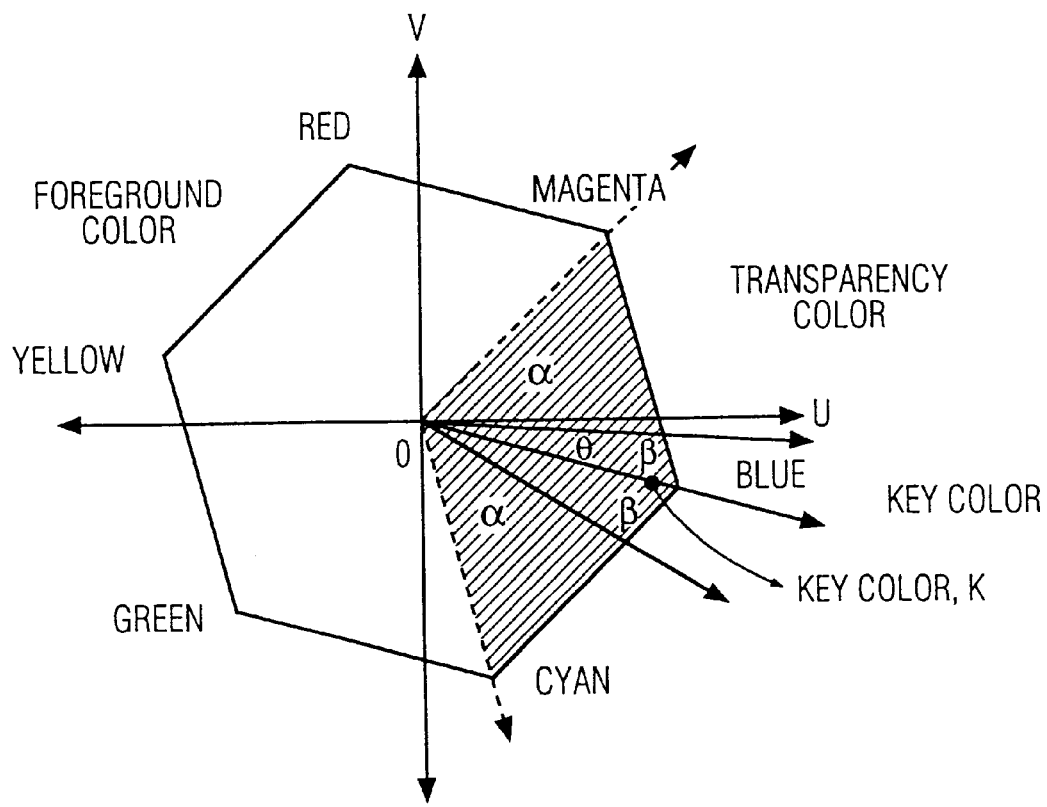
FIG. 3 is a graphical representation of some of the keying parameters used in carrying out the present invention.

As depicted in FIG. 3, a line is first drawn (step 10) which passes through the origin and the key color (nominally K). The angle that this line makes with the U-axis (in a counter-clockwise direction) is indicated as θ. Under ideal conditions, all the pixels from the chroma-key color area will fall on this line (steps 12, 13). However, under practical conditions, such as conditions that include noise and in particular, quantization noise in a prior generation, some pixels will deviate from the line. To classify such pixels, a second region around the key color line, which extends from the key color line an angular amount β (on either side of the key color line) is formed. All the pixels that lie within this region of angular width equal to 2β are classified as key color and the number of such pixels in a macroblock is quantified as $N_k$ (step 14).

When semi-transparent foreground objects are situated in front of key-color areas, colors are generated due to the mixture of key-color and reflections of foreground objects on the semi-transparent foreground object. Also, at the boundaries of ℜ, a mixture of foreground and key color is present. Hence, foreground colors are identified by defining a region around the key color line with an angular spread of α and all the pixels that lie outside this shaded region of angular width 2α are classified as foreground colors and the number of such pixels are denoted $N_f$ (step 18).

All other remaining colors (step 20) that are neither classified as the key color nor the foreground color are thereby classified as mixed colors, and the number of such pixels are denoted $N_{m'}$ (step 22).

It is to be appreciated that the total number of pixels is equal to $N_T$, where $N_T = N_k + N_f + N_m$ since for 4:2:2 video, $N_T = 128$ and U and V consist of 16×8 pixels in a macroblock.

Next, the macroblocks are classified. As depicted in FIG. 2, it is determined whether $(N_T - N_k) \div N_T < \epsilon$, where $\epsilon \cong 0.05$ (step 30). If yes, the macroblock is classified as a chroma-key color area (step 34). If the answer at decision step 30 is negative, it is determined whether $(N_T - N_f) \div N_T < \epsilon$ (step 38). If this decision step is affirmative, the macroblock is classified as a foreground object (step 42). Lastly, it is determined whether $(N_T - N_m) \div N_T < \epsilon$ (step 46). If yes, the macroblock is classified as containing transparency information (step 50). If the macroblock is not classified as one which is a chroma-key color area, a foreground object, or that which contains transparency information (that is, the colors in the macroblock are not contained entirely inside one of the three regions) the macroblock is classified as a boundary macroblock (step 54).

Thereafter, chromaticity analyzer 130 generates a weight $WC_{macroblock}$ that is used by rate controller 150 to generate the quantization step-size for each macroblock. This procedure is described as follows:

If the macroblock is a chroma-key color area or a foreground object, the quantization step-size does not need to be adjusted and can remain as the default weight. That is, chroma-key color areas and foreground objects do not need any special consideration during chroma-keying. The quantization step-size is assigned based on luminance activity alone.

Macroblocks classified as a boundary macroblock must be coded so that the quantization noise at the boundary of region ℜ is minimal and permits an overall better keying operation, while macroblocks containing transparency information must be quantized lightly since pixels in this macroblock are obtained by adding pixels in both F(x,y,t) and B(x,y,t) sequences.

Therefore, as depicted in FIG. 2, for a keycolor macroblock or a foreground macroblock, a weight, $Wc_{macroblock}$ is set to a default value, preferably a value of one (1) (step 60). For a boundary block macroblock, $WC_{macroblock}$ is preferably set to a nominal value of 0.5 (step 62). Similarly, for a macroblock containing transparency information, $WC_{macroblock}$, is preferably set to a nominal value of 0.75 (step 64). It is also to be understood that such values are preferable settings and variations will be understood to be within the skill of the artisan.

The next step is to determine the quantization step-size. Generally speaking, the determination of the quantization step-size in MPEG-like encoders is preferably performed in three steps, that is, (1) at the group-of-pictures layer, (2) the pictures layer, or (3) the macroblock layer (adaptive quantization). In order to perform quantization that is sensitive to chroma-key processing, the quantization step-size at the macroblock layer must be changed, since adaptive quantization is typically performed based only on luma data only.

As would be understood by one of skill in the art, macroblock complexity analyzer 140 generates a weight, $WL_{macroblock}$, for each macroblock, depending on the activity of the luminance data.

Returning to FIG. 2, rate controller 150 collects $WC_{macroblock}$ and $WL_{macroblock}$ for each macroblock for an entire frame (step 70). It then proceeds to compute $W_{macroblock}$ for each macroblock (step 74) from the relationship:

$$W_{macroblock} = [(WC_{macroblock}) \times (WL_{macroblock})] \div W_N,$$

where $W_N$ is understood to be the normalizing factor and is the average, over the entire frame worth of macroblocks, for the product $[(WC_{macroblock}) \times (WL_{macroblock})]$ (also step 74). That is, in the preferred embodiment, $W_{macroblock}$ is normalized to one (1).

Thereafter, as would be understood by one of ordinary skill in the art, the computation of quantization step-size (step 76) is performed, taking into account $W_{macroblock}$, the target bits and buffer fullness. Lastly, quantization (step 78) and VL coding are performed (step 79) as would also be understood in the art.

We claim:

1. A method of performing chroma-key coding, said method comprising the steps of:

defining a color region around a color line and denoting the pixels lying within said color region as a key color and quantifying the number of said pixels as $N_k$;

defining a background region around said color line and denoting the pixels lying outside said background region as foreground colors and quantifying the number of said pixels as $N_f$;

defining all other colors that are neither said key color or said foreground colors as mixed colors and quantifying the number of said pixels representing said mixed colors as $N_m$;

classifying macroblocks, said classification step comprising the substeps of:

classifying a macroblock as a chroma-key color macroblock when $(N_T-N_k) \div N_T < \epsilon$, where $\epsilon$ is a predefined constant;

classifying a macroblock as a foreground object macroblock when $(N_T-N_f) \div N_T < \epsilon$;

classifying a macroblock as a transparency information macroblock when $(N_T-N_m) \div N_T < \epsilon$; and classifying a macroblock as a boundary macroblock when said macroblock is not a chroma-key color macroblock, a foreground object macroblock or a transparency macroblock;

assigning a chroma complexity weight for use in the computation of quantization step-size and based on the classification of the macroblocks, said assigning step comprising the substeps of:

assigning a predetermined chroma complexity weight, $WC_{macroblock}$ to the macroblock, said macroblock being one of a chroma-key color macroblock, foreground macroblock, transparency information macroblock and boundary block; and computing quantization step-size based on said $WC_{macroblock}$.

2. The method as claimed in claim 1, wherein said color is blue.

3. The method as claimed in claim 1, wherein said computing step includes the further steps of computing a normalization factor $W_N$ and computing the normalized weight, $W_{macroblock}$.

4. The method as claimed in claim 1, wherein $WC_{macroblock}$ is assigned a value of one (1) when the macroblock is one of a foreground macroblock and a chroma-key color macroblock.

5. The method as claimed in claim 4, wherein $WC_{macroblock}$ is assigned a value of 0.75 of the weight assigned to $WC_{macroblock}$ of a foreground or chroma-key color macroblock when said macroblock is a transparency macroblock.

6. The method as claimed in claim 4, wherein $WC_{macroblock}$ is assigned a value of 0.50 of the weight assigned to $WC_{macroblock}$ of a foreground or chroma-key color macroblock when said macroblock is a boundary macroblock.

7. A method of quantization based on the chromacity of a given macroblock, said method comprising the steps of:

defining a color region around a color line and denoting the pixels lying within said color region as a key color and quantifying the number of said pixels as $N_k$;

defining a foreground region around said color line and denoting the pixels lying outside said foreground region as foreground colors and quantifying the number of said pixels as $N_f$;

defining all other colors that are neither said key color or said foreground colors as mixed colors and quantifying the number of said pixels representing said mixed colors as $N_m$;

classifying macroblocks, said classification step comprising the substeps of:

classifying a macroblock as a chroma-key color macroblock when $(N_T-N_k) \div N_T < \epsilon$, where $\epsilon$ is a predefined constant;

classifying a macroblock as a foreground object macroblock when $(N_T-N_f) \div N_T < \epsilon$;

classifying a macroblock as a transparency information macroblock when $(N_T-N_m) \div N_T < \epsilon$; and classifying a macroblock as a boundary macroblock when said macroblock is not a chroma-key color macroblock, a foreground object macroblock or a transparency macroblock; and assigning a chroma complexity weight for use in the computation of quantization step-size and based on the classification of the macroblocks, said assigning step comprising the substeps of:

assigning a predetermined chroma complexity weight, $WC_{macroblock}$ to the macroblock, said macroblock being one of a chroma-key color macroblock, foreground macroblock, transparency information macroblock and boundary block; and computing quantization step-size based on said $WC_{macroblock}$.

8. The method as claimed in claim 7, wherein said color is blue.

9. The method as claimed in claim 7, wherein said color is red.

10. The method as claimed in claim 7, wherein said color is green.

11. The method as claimed in claim 7, wherein said computing step includes the further steps of computing a normalization factor $W_N$ and computing the normalized weight, $W_{macroblock}$.

12. The method as claimed in claim 7, wherein said $WC_{macroblock}$ is assigned a value of one (1) when the macroblock is one of a foreground macroblock and a chroma-key color macroblock.

13. The method as claimed in claim 12, wherein said $WC_{macroblock}$ is assigned a value of 0.75 of the weight assigned to $WC_{macroblock}$ of a foreground or chroma-key color macroblock when said macroblock is a transparency macroblock.

14. The method as claimed in claim 12, wherein said $WC_{macroblock}$ is assigned a value of 0.50 of the weight assigned to $WC_{macroblock}$ of a foreground or chroma-key color macroblock when said macroblock is a boundary macroblock.

15. A method of performing chroma-key coding, said method comprising the steps of:

defining a color region around a color line and denoting the pixels lying within said color region as a key color and quantifying the number of said pixels as $N_k$;

defining a background region around said color line and denoting the pixels lying outside said background region as foreground colors and quantifying the number of said pixels as $N_f$; defining all other colors that are neither said key color or said foreground colors as mixed colors and quantifying the number of said pixels representing said mixed colors as $N_m$;

classifying macroblocks, said classification step comprising the substeps of: classifying a macroblock as a chroma-key color macroblock when $(N_T-N_k) \div N_T < \epsilon$, where $\epsilon$ is a predefined constant; classifying a macroblock as a foreground object macroblock when $(N_T-N_f) \div N_T < \epsilon$; classifying a macroblock as a transparency information macroblock when $(N_T-N_m) \div N_T < \epsilon$; and classifying a macroblock as a boundary macroblock when said macroblock is not a chroma-key color macroblock, a foreground object macroblock or a transparency macroblock;

assigning a chroma complexity weight for use in the computation of quantization step-size and based on the classification of the macroblocks, said assigning step comprising the substeps of:

assigning a predetermined chroma complexity weight, $WC_{macroblock}$ to the macroblock, said macroblock being one of a chroma-key color macroblock, foreground macroblock, transparency information macroblock and boundary block; and computing $W_N$ and $W_{macroblock}$;

computing the quantization step-size;

performing quantization; and perform variable length coding.

* * * * *